United States Patent [19]

Yokoi

[11] 4,403,216

[45] Sep. 6, 1983

[54] DISPLAY

[75] Inventor: Gunpei Yokoi, Kyoto, Japan

[73] Assignee: Nintendo Co., Ltd., Kyoto, Japan

[21] Appl. No.: 256,257

[22] Filed: Apr. 22, 1981

[30] Foreign Application Priority Data

Dec. 11, 1980 [JP] Japan .............................. 55-178636[U]
Dec. 29, 1980 [JP] Japan .............................. 55-187780[U]
Feb. 28, 1981 [JP] Japan .............................. 56-27825[U]

[51] Int. Cl.³ .......................... G06F 3/14; A63F 9/00
[52] U.S. Cl. ................................ 340/705; 340/784;
340/700; 340/702; 273/1 GC; 273/85 G;
350/339 F; 40/365; 40/448
[58] Field of Search ............... 340/784, 701, 702, 700,
340/705; 434/26; 40/363, 365, 448, 571;
350/339 F, 334; 273/1 GC, 856, 237

[56] References Cited

U.S. PATENT DOCUMENTS

| T936,004 | 7/1975 | Willis | 340/784 |
|---|---|---|---|
| 3,698,102 | 10/1972 | Driskell | 434/26 |
| 3,900,703 | 8/1975 | Tickle | 439/26 |
| 4,117,607 | 10/1978 | Gill | 434/201 |
| 4,187,671 | 2/1980 | Fatton | 273/138 A |
| 4,188,779 | 2/1980 | Fatton | 273/138 A |
| 4,231,090 | 10/1980 | Fatton | 273/138 A |
| 4,241,339 | 12/1980 | Ushiyama | 340/784 |
| 4,328,493 | 5/1982 | Shanks et al. | 340/784 |

FOREIGN PATENT DOCUMENTS

| 2847135 | 5/1980 | Fed. Rep. of Germany | 340/700 |
|---|---|---|---|
| 1464875 | 2/1977 | United Kingdom . | |
| 1540965 | 2/1979 | United Kingdom . | |

*Primary Examiner*—Vance Y. Hum
*Assistant Examiner*—Leo P. Picard
*Attorney, Agent, or Firm*—W. G. Fasse; D. H. Kane, Jr.

[57] ABSTRACT

A liquid crystal display apparatus comprises a first and second housing portions. The first and second housing portions are coupled so that the angle of the opposing surfaces may be adjustable. A light transmitting portion is formed on the upper surface of the first housing portion. The light beam received by the light transmitting portion is further transmitted through a liquid crystal plate and a colored filter housed in the first housing portion and then is led to impinge upon the mirror provided on the second housing portion. An image formed on the liquid crystal plate can be observed as a multicolored image through a light beam reflected from the mirror.

16 Claims, 17 Drawing Figures

DISPLAY

BACKGROUND OF THE INVENTION

1. Field of the Invention

The present invention relates to a display and more particularly to a liquid crystal display suited for a hand-held desk-top game apparatus.

2. Description of the Prior Art

Figure 1:
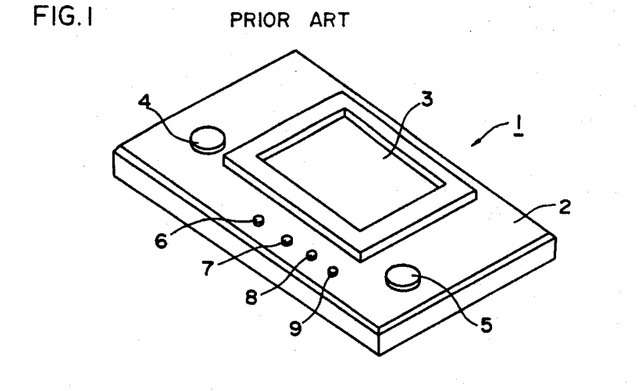
FIG. 1 is a perspective view showing an appearance of a handheld type game apparatus taken as one example of a conventional liquid crystal display.

FIG. 1 is a perspective view showing an appearance of a hand-held type game apparatus taken as an example of a conventional liquid crystal display 1. Such game apparatus may be similar to that disclosed in the copending U.S. patent application Ser. No. 161,344, which corresponds to United Kingdom Application No. 8,020,281 and German Patent Application No. P 30 24 041.6 but such game apparatus will be described briefly to the extent required for describing the present invention.

Referring to FIG. 1, a housing 2 comprises a liquid crystal display portion 3 at a portion of the upper surface of the housing 2. The housing 2 further comprises at the other portions of the upper surface thereof game mode switches 6 to 9 for commanding a start of a game mode and for selecting the degree of difficulty of playing a game and character moving/changing switches 4 and 5 for moving and changing a predetermined character being displayed on the liquid crystal display portion 3.

Usually such liquid crystal display comprises a reflecting plate, not shown, on the rear surface of the liquid crystal display portion 3, i.e. on the surface at the side of the housing 2. A light beam incident upon the liquid crystal display portion 3 from outside the housing 2 is transmitted through the liquid crystal display portion 3 and then the light beam is reflected from the reflecting plate, not shown, provided on the rear surface thereof and is again led outside the liquid crystal display portion 3 after transmission thereof through the liquid crystal display portion 3. However, in the case where a segment electrode, not shown, formed in the liquid crystal display portion 3 is driven for display, the light beam incident upon the segment electrode portion is scattered or absorbed depending on the nature of the liquid crystal, with the result that the light beam does not reach the reflecting plate. Accordingly, the segment electrode portion being driven for display becomes considerably low in brightness as compared with that in the other portions, whereby the difference in brightness produces an image being displayed on the liquid crystal display portion 3. More specifically, a user observes a light beam reflected from the liquid crystal display portion 3, thereby to recognize the information being displayed by the liquid crystal display portion 3.

However, since the conventional liquid crystal display 1 has at the same side a light receiving surface where a light beam from outside is received by the liquid crystal display portion 3 and a light image observing surface where an image being displayed by a light beam reflected from the liquid crystal display portion 3, a problem was involved that it could happen that the image becomes difficult to be observed depending on the surrounding brightness and the angle at which the liquid crystal display portion 3 is observed. The reasons will be described in the following by taking a specific example. More specifically, in the case where the surrounding brightness in observing the liquid crystal display 1 is dark, an absolute light beam amount impinging upon the liquid crystal display 3 is decreased, whereby a contrast between the segment electrode portion being driven for display and the portion other than the driven portion is decreased, whereby discrimination therebetween becomes less easy. Conversely, the surrounding brightness in which the liquid crystal display 1 is observed is increased, an ample light beam amount is obtained and the above described problem will be eliminated. However, in such a case an amount of a light beam being reflected from an outer glass surface of the liquid crystal display portion 3 is accordingly increased. Therefore, depending on the angle at which the liquid crystal display portion 3 is observed, an amount of the light beam being reflected from the outer glass surface of the liquid crystal display portion 3 becomes larger than that reflected from the reflecting plate. In such a case, it becomes difficult for a user to discern a background area as viewed on the outer glass surface and the image being displayed on the liquid crystal display portion 3. For example, if and when a light source per se is seen on the outer glass surface, the image being displayed becomes hardly visible. In particular, since hand-held electronic machines such as a game apparatus, a pocketable calculator, an electronic wristwatch, and the like having a liquid crystal display are observed by a user while the same are held by hand, a viewing direction and an outer light beam direction are not constant and accordingly the above described problems are caused more often.

SUMMARY OF THE INVENTION

Briefly described, the inventive display comprises a liquid crystal plate housed inside a housing. The housing has a light transmitting portion formed on a first side surface for transmitting a light beam therethrough and a window formed on a second side surface. The housing is further provided with a mirror on the surface thereof or inside thereof having a predetermined position or an angle relation with respect to the liquid crystal plate. The window is formed on the path of a light beam reflecting from the mirror and an image being formed by the liquid crystal plate upon transmission of a light beam from the light transmitting portion is observed through the window.

According to the present invention, the liquid crystal plate and the mirror are disposed in a predetermined positional relation by the use of the housing having a light transmitting portion, and the side where a user observes the image on the liquid crystal plate and the side where a light beam is introduced from the outside onto the liquid crystal plate are separated or are selected to be different. As a result, always a clear image being displayed can be observed without being influenced by the surrounding brightness.

In a preferred embodiment of the present invention, in order to display at least two characters in different colors, a color filter including at least two color regions is provided in the vicinity of and to be faced to one or the other side of the liquid crystal plate. One of the segment electrodes formed on the liquid crystal plate and the color region of the color filter, as opposed to each other, is shaped in a character shape being displayed, while the other of the opposed ones is selected to have the size covering at least the character configuration. Thus, a character being displayed can be displayed in multiple colors using a liquid crystal display plate of such simple structure.

In another preferred embodiment of the present invention, the display comprises first and second housing portions. The first housing portion is provided with a light transmitting portion, whereas the second housing portion is provided with a mirror at a predetermined position. The first and second housing portions are coupled to each other so that the surface opposing angle may be adjustable. As a result, a light beam from the light transmitting portion is transmitted through the liquid crystal plate housed in the first housing portion and impinges upon the mirror in the second housing portion. As a result, an image formed on the liquid crystal plate can be observed by a light beam reflected from the mirror. The first and second housing portions may be structured to be foldable. Thus, by dividing the housing into the first and second housing portions, the display can be made compact. As a result, the present invention is suited for a liquid crystal display of such as a game apparatus of a hand-held type or a desk-top type.

Accordingly, a principal object of the present invention is to provide a display that is capable of displaying an image with much clearness, without being influenced by the surrounding brightness.

Another aspect of the present invention resides in a display that is capable of displaying an image in multiple colors using a simple structure.

A further aspect of the present invention resides in a display structured in a compact manner.

Still a further aspect of the present invention resides in a display suited for a game apparatus of a hand-held type or desktop type.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
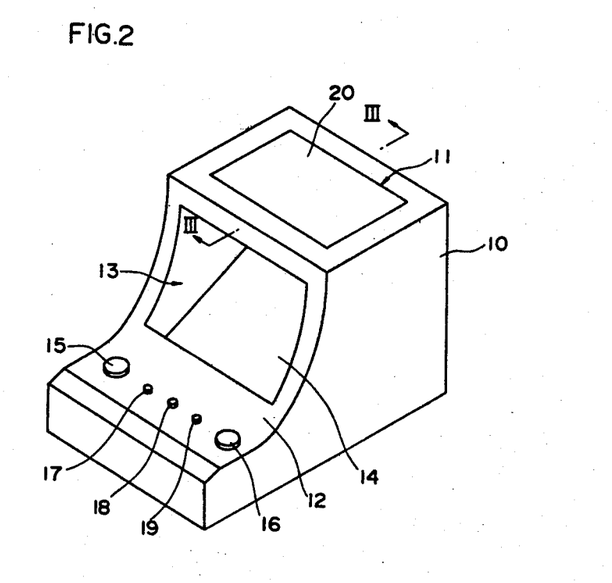
FIG. 2 is a perspective view showing an appearance of one embodiment of the present invention.
Figure 3:
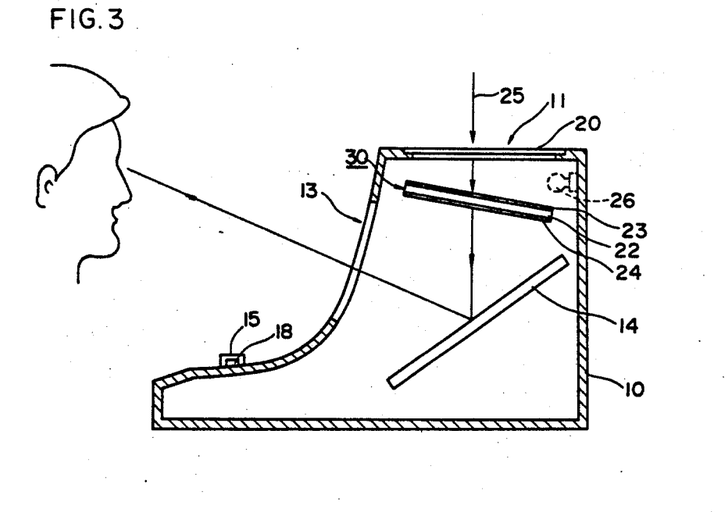
FIG. 3 is a sectional view taken along the line III—III in FIG. 2.

FIG. 2 is a perspective view showing an appearance of one embodiment of the present invention as embodied in a game apparatus of a desk-top type. FIG. 3 is a sectional view taken along the line III—III in FIG. 2. FIG. 3 shows only a structure of a portion of interest to the present invention for facility of description and a scheme for driving a liquid crystal display has been omitted. Referring to FIGS. 2 and 3, a housing 10 is formed at the top thereof with a light transmitting portion 11 for transmitting a light beam from the outside into the inside of the housing 10. The light transmitting portion 11 comprises a ground glass 20 serving as means for scattering a light beam. By mounting the ground glass 20, a light beam 25 from the outside is uniformly scattered into the housing 10. A polyethylene sheet of a rough surface may be used in place of the ground glass 20. In such a case, a transparent glass is first mounted on the light transmitting portion 11 and then the above described polyethylene sheet may be mounted thereon. The front surface 12 of the housing 10 is formed in a curved surface. A window 13 is formed at a portion of the front surface of the housing 10. The housing 10 is further provided at the other portions of the front surface 12 with mode switches 17 to 19 and character moving/changing switches 15 and 16, as in the case of the FIG. 1 apparatus.

On the other hand, a liquid crystal plate 30 and a mirror 14 are held inside the housing 10 at a predetermined positional relation. More specifically, the liquid crystal plate 30 is disposed below the light transmitting portion 11 so that the light beam 25 coming from the outside through the ground glass 20 is directly fed thereto. The liquid crystal plate 30 comprises a twisted nematic type liquid crystal layer 22 and polarized filters 23 and 24 formed on both surfaces thereof. However, in the case where any other type of liquid crystal layer is employed, a polarized filter may be provided only on one surface thereof or may be omitted. The mirror 14 is disposed further below the liquid crystal plate 30 at a predetermined angle. More specifically, the mirror 14 is disposed so that the light beam transmitting through the liquid crystal plate 30 is reflected from the mirror 14 in the direction toward the window 13. Accordingly, a user can observe through the window 13 an image being displayed of the liquid crystal plate 30 as projected onto the mirror 14. Meanwhile, preferably the mirror 14 is disposed at the angle of approximately 45° with respect to the liquid crystal plate 30. It has been observed by experimentation of the present inventors that by doing so an image being displayed of the liquid crystal plate becomes most clearly visible.

Figure 17:
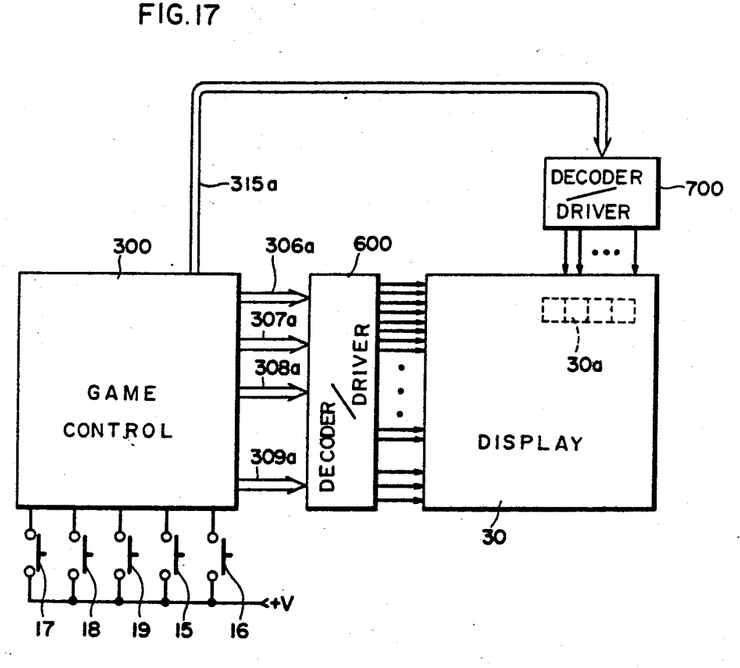
FIG. 17 is a block diagram showing an outline of a liquid crystal display control of the FIG. 2 embodiment.

FIG. 17 is a block diagram showing an outline structure of a liquid crystal display control of the FIG. 2 embodiment. Basically the liquid crystal display control comprises a game control circuit 300. The display 30 is connected to be driven by a decoder/driver 600 for receiving a signal from the game control circuit 300 and for displaying a figure, and a decoder/driver 700 for receiving a signal from the game control circuit 30 and for displaying a numerical value. The game control circuit 300 is connected to the various switches 15, 16, 17, 18 and 19 described in conjunction with FIG. 2. The game control circuit 300 is responsive to operation or an operation state of the character moving/changing switches 15 and 16 to supply the data for driving for display the segment electrodes formed on the display 30 through data buses 306a, 307a 308a. The game control circuit 300 is further responsive to operation of the mode switches 17, 18 and 19 to supply the data for selecting a game start or a game mode to the decoder/driver 600 through a data bus 309a. At the same time the game control circuit 300 provides score point data attained by a player through operation of the character moving/changing switches 15 and 16 through a bus 315a to the decoder/driver 700. Accordingly, the display 30 displays the score point data at the numerical value display portoion 30a.

Since the FIG. 2 embodiment is structured in the above described manner, the angle at which the image being displayed of the liquid crystal plate 30 is observed becomes substantially constant and as a result easiness of observation can be always secured. Furthermore, since the side where the user observes the image being displayed of the liquid crystal plate 30 and the side where the light beam 25 from the outside is entered into the liquid crystal plate 30 are different, an image being displayed can be clearly observed without being influenced by the surrounding brightness.

Figure 4:
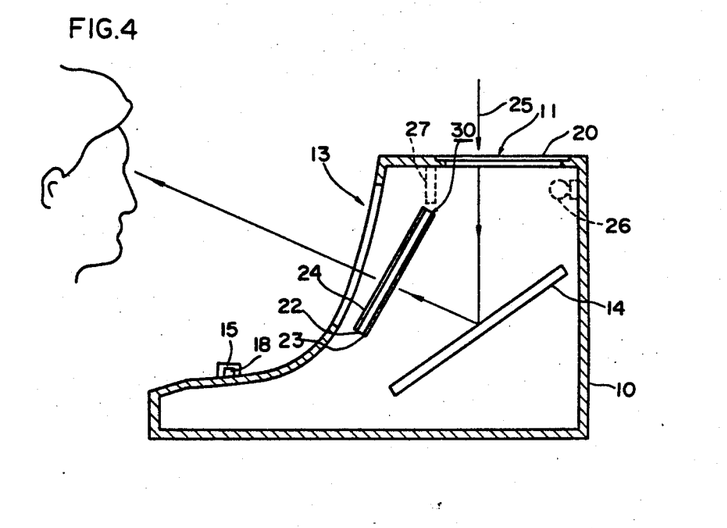
FIG. 4 is similar to FIG. 3 and is a sectional view of another embodiment of the present invention.

FIG. 4 is similar to FIG. 3 but shows a sectional view of another embodiment of the present invention. Referring to FIG. 4, the mirror 14 is disposed below the light transmitting portion 11 of the housing 10 so that the light beam 25 from the outside transmitting through the ground glass 20 may be directly received. The mirror 14 is held in the housing 10 at the angle selected such that the received light beam may be reflected thereby in the direction toward the window 13. The liquid crystal plate 30 is held in the housing 10 so as to be positioned between the window 13 and the mirror 14. Accordingly, in the FIG. 4 embodiment a viewer directly observes the liquid crystal plate 30 through the window 13, as is different from the FIG. 2 embodiment. The light transmitting portion 11 is not provided above the liquid crystal plate 30. As a result, the light beam 25 coming from the outside through the light transmitting portion 11 does not directly impinge upon the liquid crystal plate 30 to be reflected therefrom, whereby an image being displayed of the liquid crystal plate 30 can be more clearly observed. More preferably, a light shielding plate 27 may be provided as shown by the dotted line in FIG. 4.

As in the case of the embodiment shown in FIGS. 2 and 3, the FIG. 4 embodiment also separates the side where the liquid crystal plate 30 is observed by a viewer and the side where the light beam 25 coming from the outside is entered onto the liquid crystal plate 30 and accordingly makes it possible to observe an image being displayed clearly without being influenced by the surrounding brightness.

Meanwhile, by providing a light source 26 to be energized by a battery, not shown, for example as shown by the dotted line in FIGS. 3 and 4, an image being displayed of the liquid crystal plate 30 can be clearly observed even in a dark circumstance. Since it would be seldom that an image being displayed is observed using such light source 26, power consumption by the light source 26 may be small. Since usually an external incident light beam is available from upward, the light transmitting portion 11 is provided on the top of the housing 10 in the embodiment shown in FIGS. 2 to 4, so that the best light receiving condition may be attained. However, depending on the positional situation between the liquid crystal plate 30 and the mirror 14, the light transmitting portion 11 may be provided at the side or the rear of the housing 10.

Figure 5:
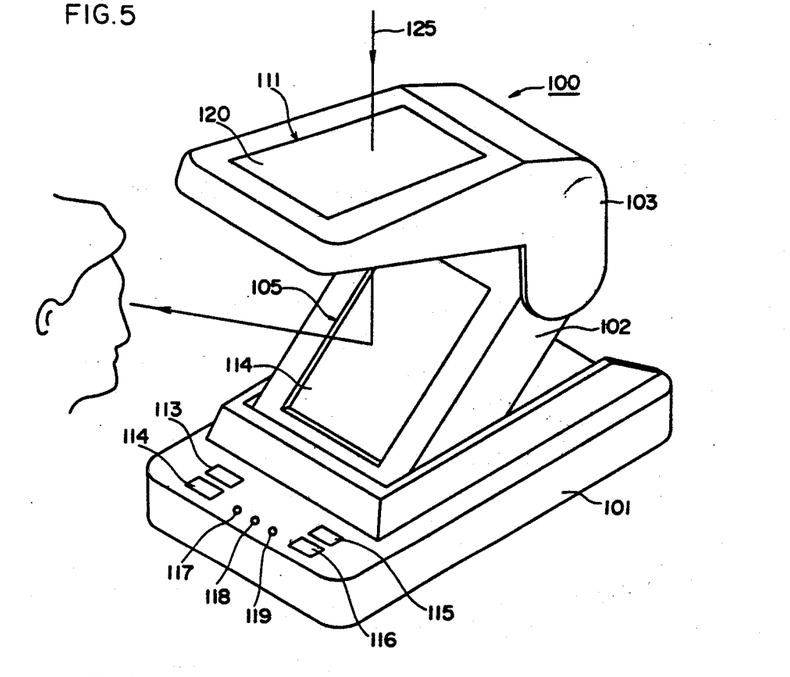
FIG. 5 is a perspective view showing an appearance of still a further embodiment of the present invention.
Figure 6:
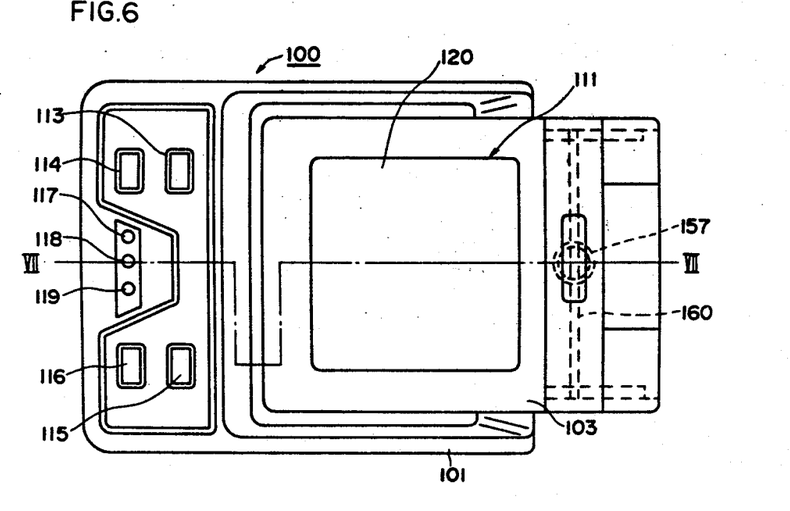
FIG. 6 is a plan view of the FIG. 5 embodiment.

FIG. 5 is a perspective view showing an appearance of a hand-held type game apparatus in accordance with still a further embodiment of the present invention and particularly showing an appearance of the same in the use state. FIG. 6 is a plan view of the FIG. 5 embodiment. The liquid crystal display basically comprises a base 101, a first housing portion 103 and a second housing portion 102. The base 101 is provided with character moving/changing switches 113 to 116 and game mode switches 117 to 119, as in the case of the FIG. 1 game apparatus. The second housing portion 102 is rotatably supported at one end thereof by the base 101. A mirror 114 is housed in the second housing portion 102. A window 105 is formed in the second housing portion 102, so that the mirror 114 may be exposed. On the other hand, the first housing portion 103 is rotatably supported at one end thereof by the other end of the second housing portion 102. As to be fully described subsequently, a liquid crystal plate is housed in the first housing portion 103. A light transmitting portion 111 for transmitting a light beam 125 from the outside into the inside of the housing 103 is provided on the top surface of the first housing portion 103. A ground glass 120 is mounted to the light transmitting portion 111 providing a light scattering means. Provision of the ground glass 120 makes it possible to scatter the light beam 125 from the outside uniformly onto the surface of the liquid crystal plate housed in the first housing portion 103. A polyethylene sheet having a rough surface may be utilized in place of the ground glass 120.

Meanwhile, although not shown in FIG. 5, a light transmitting window (see FIG. 8) is formed on the lower surface of the first housing portion 103. Accordingly, the light beam 125 from the outside is introduced through the ground glass 120 into the inside of the first housing portion 103 and impinges upon the mirror 114 after the same is transmitted through the liquid crystal plate (see FIGS. 7 and 8) housed inside the first housing portion 103. The light beam reflected from the mirror 114 is observed by a viewer, for example. More specifically, the viewer observes an image being displayed of the liquid crystal plate as projected onto the mirror 114.

Figure 7:
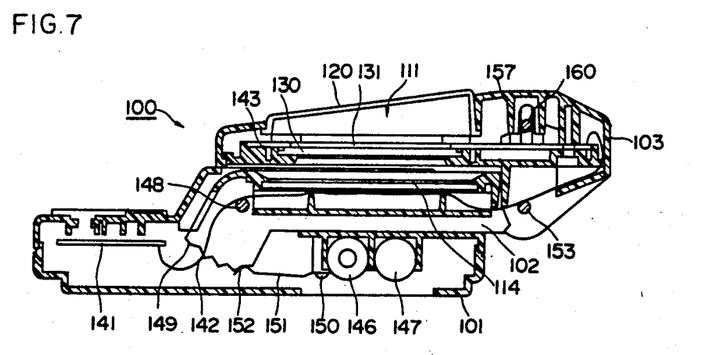
FIG. 7 is a sectional view taken along the line VII—VII in FIG. 6.
Figure 8:
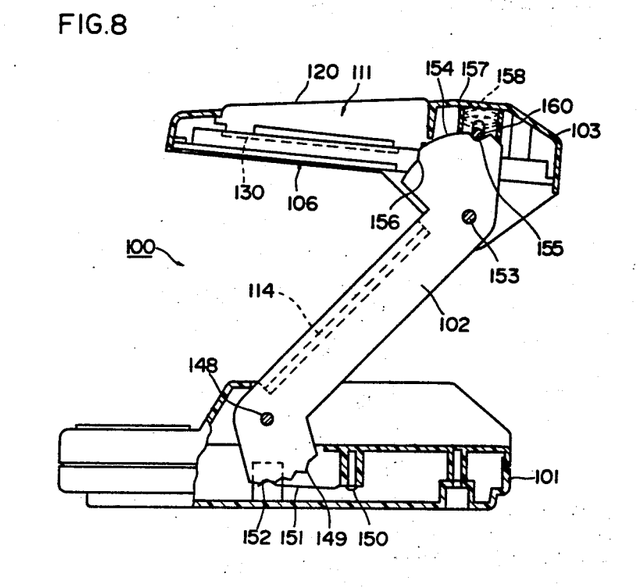
FIG. 8 is a right side view, partially fragmentary, of the FIG. 5 embodiment.

FIG. 7 is a sectional view taken along the line VII—VII in FIG. 6. FIG. 8 is a right side view, partially fragmentary, of the FIG. 5 embodiment. Referring to FIGS. 7 and 8, a structure of the liquid crystal display 100 will be described in more detail.

As shown in FIG. 7, the base 101 is provided with a switch base plate 141. The switch base plate 141 is connected to one end of a connection line 142. The connection line 142 is introduced through the inside of the second housing portion 102 into the first housing portion 103. A liquid crystal display base plate 143 is provided inside the first housing portion 103 and the other end of the connection line 142 is connected to a liquid crystal driving means, not shown, formed on the liquid crystal display base plate 143. The liquid crystal plate 130 is provided on the portions in the liquid crystal display base plate 143 facing the light transmitting portion 111 and the light transmitting window 106. The liquid crystal plate 130 is driven by the liquid crystal display driver provided on the liquid crystal display base plate 143. Batteries 146 and 147 are housed in the base plate 101 so that an electric power required for driving the liquid crystal plate 130 is supplied from these batteries 146 and 147. A color filter 131 for enabling multicolored display is provided on the liquid crystal plate 130. The color filter 131 will be described subsequently.

The second housing portion 102 is pivoted by an shaft 148 supported at both ends thereof by the base 101, whereby the same is mounted onto the base 101. The second housing portion 102 is bent in the vicinity of one end thereof, so that a end surface 149 of the bent portion is formed to extend on an arcuate portion with the shaft 148 as the center thereof. A plurality of recesses are formed at the end surface 149 of the bent portion. Accordingly, the bent end surface 149 is formed in a corrugated fashion in section. On the other hand, a leaf spring 151 fixed by means of a screw 150 is provided inside the base 101. The leaf spring 151 is provided to extend in the direction of one end surface 149 of the second housing portion 102. A portion portion 152 being fitted into the recess formed at the end surface 149 of the bent portion is provided in the vicinity of the end thereof. More specifically, with the protruding portion 152 being fitted into the recess of the end surface 149 of the bent portion, the second housing portion 102 is supported with respect to the base 101. If and when the second housing portion 102 is raised or turned down against a spring force of the leaf spring 151, the protruding portion 152 can be fitted into any of the recesses. Accordingly, the second housing portion 102 is held at an angle as selected with respect to the base 101.

One end of the first housing portion 103 is journaled by the shaft 153 supported by the second ousing portion 102 at both ends thereof, so that the same is rotatably supported with respect to the second housing portion 102. The second housing portion 102 has the other end bent in the direction opposite to the bending direction in the vicinity of one end described previously. The bent portion is formed in a fan shape in the shaft 153 as the center. Furthermore, recesses 155 and 156 are formed on the arcuate surface 154 of the bent portion. On the other hand, a cylinder 157 having a notch formed in the width direction of the liquid crystal display 100 is formed on the sealing portion of the first housing portion 103. A spring 158 is mounted inside the cylinder 157. A shaft 160 is mounted extending in the width direction of the liquid crystal display 100 so as to be fitted into the notches of the cylinder 157. Accordingly, the shaft 160 is normally urged to be in pressure contact with the arcuate surface 154 at the end of the second housing portion 102. Therefore, with the liquid crystal display 100 folded, the shaft 160 is fitted into the recess 156, whereby a folded state is maintained. Conversely, when the liquid crystal display 100 is expanded as shown in FIG. 8, the shaft 160 is fitted into the recess 155, whereby the first housing portion 103 is maintained expanded with respect to the second housing portion 102. Thus, the shaft 160 serving as a supporting member of the first housing portion 103 is simply mounted into the notch of the cylinder 157, without necessity of any tiresome step of screwing. Therefore, an assembling process is simplified and the number of components such as screws can be decreased.

According to arrangement, an image to be displayed by the liquid crystal plate 130 can be most readily viewed when the surface opposiing angle of the liquid crystal plate 130 and the mirror 114 is approximately 45°. Therefore, the apparatus is structured such that the surface opposing angle of the first housing portion 103 and the second housing portion 102 may be approximately 45° with the shaft 160 fitted into the recess 155.

As is clear from the above described structure, since the FIG. 5 embodiment has the side where the liquid crystal plate 130 is viewed by a viewer and the side where the light beam 125 from the outside is introduced onto the liquid crystal plate 130 at different sides, an image being displayed can be viewed very clearly without being influenced by the surrounding brightness. Futhermore, since the housing portion where the liquid crystal plate 130 is housed and the housing portion where the mirror 114 is fixed are made separate, while these housing portions are rotatably coupled, these housing portions are foldable and as a result a very compact liquid crystal display can be provided. In addition, since the base 101 and the second housing 102 are structured so that the angle therebetween may be selectable, the light receiving direction and the reflecting direction from the mirror can be adjusted depending upon the surrounding condition, with the result that always the best display state can be attained.

Figure 9:
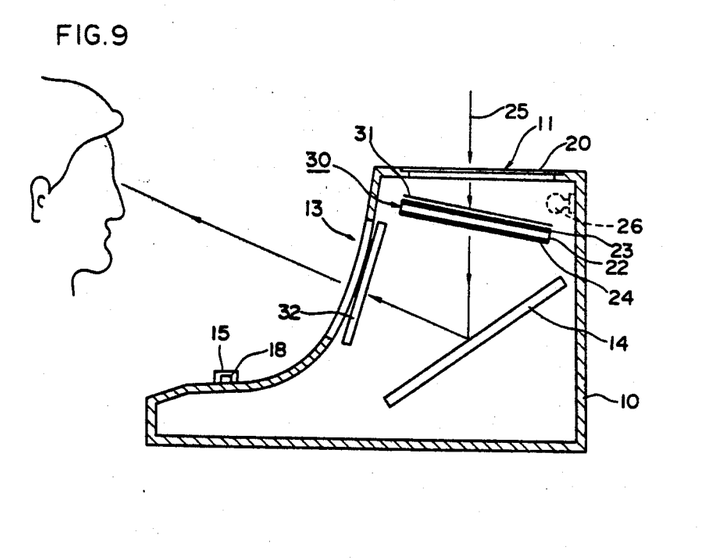
FIG. 9 is a sectional view of still a further embodiment of the present invention.

FIG. 9 is a sectional view of still a further embodiment of the present invention. The FIG. 9 embodiment is similar to the FIG. 3 embodiment, except that a color filter 31 for displaying characters being displayed in multiple colors is provided in the vicinity of the liquid crystal plate 30 and a smoked plate 32 is provided in the vicinity of the window 13. Since those portions of the FIG. 9 embodiment other than the above described different point are substantially the same as those of the FIG. 3 embodiment, the same portions are denoted by the same reference characters and a detailed description thereof is omitted.

As to be described subsequently, the color filter 31 comprises a plurality of color regions, whereby the characters being displayed can be displayed in multiple colors. The smoked plate 32 may be made of an acryl resin plate of a natural gray. Provision of the smoked plate 32 in the vicinity of the window 13 can prevent th surface of the liquid crystal plate (the surface at the side of the polarized filter 24) from becoming too light due to the light beam incident from the window 13 to make unclear the display.

Figure 10:
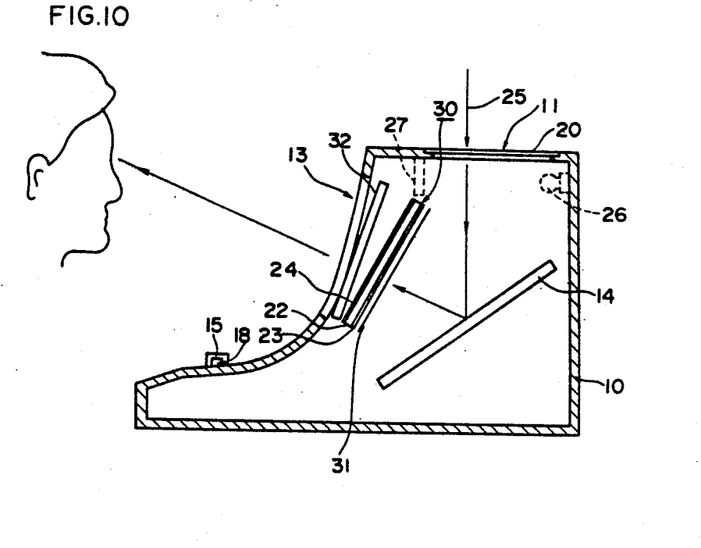
FIG. 10 is a sectional view of still a further embodiment of the present invention.

FIG. 10 is a sectional view of still a further embodiment of the present invention. The FIG. 10 embodiment is similar to the FIG. 4 embodiment but is different in that a color filter 31 for displaying characters being displayed in multiple colors is provided in the vicinity of the liquid crystal plate 30 and a smoked plate 32 is provided in the vicinity of the window 13. Since the remaining portions of the FIG. 10 embodiment are substantially the same as those of the FIG. 4 embodiment, the same portions are denoted by the same reference characters and detailed description thereof will be omitted. The effects being brought about by provision of the color filter 31 and the smoked plate 32 are also the same as those in the case of the FIG. 9 embodiment.

Figure 11:
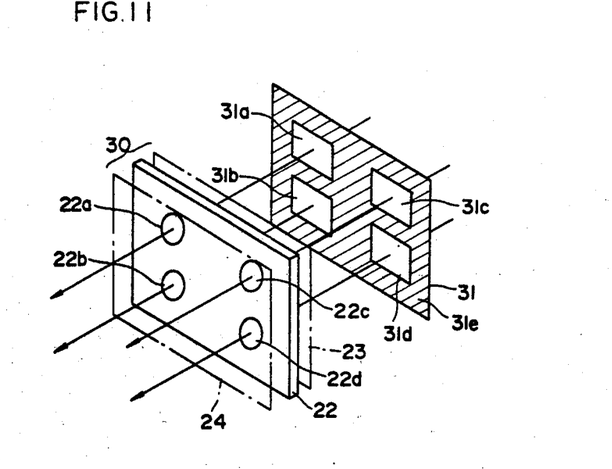
FIG. 11 shows a perspective view of one example of a preferred arrangement of the liquid crystal plate and the color filter for use in the embodiments shown in FIGS. 9 and 10.

FIG. 11 is a view showing a preferred example of the liquid crystal plate 30 and the color filter 31 for use in the embodiments depicted in conjunction with FIGS. 9 and 10. Display segments 22a, 22b, 22c and 22d are formed on the liquid crystal layer 22. The liquid crystal layer 22 is of a twisted nematic type, as described previously and the polarized filters 23 and 24 are formed on both surfaces. The polarization axis of these polarized filters 23 and 24 are selected in a predetermined relation, so that the light beam incident upon the portion other than the display segments 22a to 22d being selectively driven for display may not transmit therethrough. More specifically, the liquid crystal plate 30 comprising the liquid crystal layer 22 and the polarized filters 23 and 24 is transmissible of a light beam only at the display segment portions being selectively driven for display.

Such a structure may be implemented using a liquid crystal layer of a type other than a twisted nematic type. However, employment of a twisted nematic type in a liquid crystal layer makes it possible to provide the above described liquid crystal plate 30 with a simplest structure.

A color filter 31 is disposed in the vicinity of and to be faced to the above described liquid crystal plate 30. The color filter 31 comprises a transparent film such as polyester. The transparent film includes filter portions 31a and 31d and an opaque portion 31e as hatched in FIG. 11 formed through a screen process. The filter portions 31a to 31d are formed to cover at least the display segments 22a to 22d at the positions facing the display segments 22a to 22d, respectively. These filter portions 31a to 31d are each formed as a filter allowing for transmission of only a light beam of a color in which display of the displa segments 22a to 22d is desired. For example, in the case where it is desired that the display segment 22a is displayed in red, the display segment 22b is displayed in yellow, the display segment 22c is displayed in blue and the display segment 22d is displayed in green, the filter portion 31a is formed as a red color filter, the filter portion 31b is formed as a yellow color filter, the filter portion 22c is formed as a blue color filter, and the filter portion 22d is formed as a green color filter. Meanwhile, such color filter 31 may be implemented by forming the filter portions 31a to 31d and the opaque portion 31e separately such that these members are combined to constitute the color filter 31.

Figure 12:
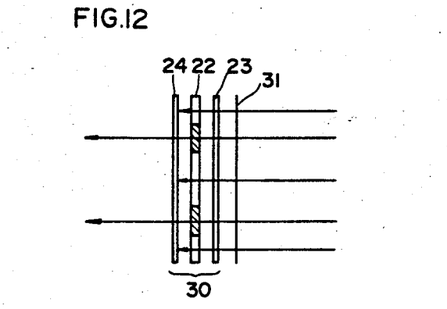
FIG. 12 is a sectional view of the FIG. 11 embodiment.

FIG. 12 is a sectional view of the FIG. 11 embodiment. As shown in FIG. 12, the light beam transmitting through the color filter 31 is introduced to impinge upon the liquid crystal plate 30. The light beam incident upon the liquid crystal plate 30 is allowed to transmit only the display segment portion being selectively driven for display. The reason is that only the polarization axis of the light beam transmitting through the display segment being selectively driven for display comes to coincide with the polarization axis of the polarization filter 24, whereas the light beam transmitting through the other portion comes to deviate by 90° from the polarization axis of the polarization filter 24.

Since the filter portions 31a to 31d are disposed to be faced to the display segments 22a to 22d, respectively, the display segments 22a to 22d can be displayed in desired colors.

Figure 13:
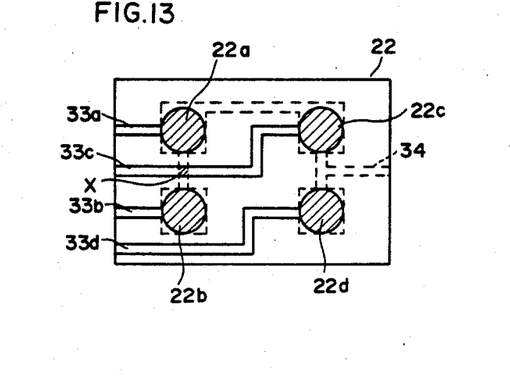
FIG. 13 is a view for explaining the advantage of the color filter shown in FIG. 11.

FIG. 13 is a view showing the advantage of the color filter 31 shown in FIG. 11. As shown in FIG. 13, the liquid crystal layer 22 is formed with a common electrode 34 shown by the dotted line and a plurality of segment electrodes 33a to 33d. The overlapping portions, as hatched, between the segment electrodes 33a to 33d and the common electrode 34 constitute the display segments 22a to 22d, respectively, shown in FIG. 11. In the case where it is desired to display the display segment 22a, for example, using the above described liquid crystal layer 22, a voltage is applied between the segment electrode 33a and the common electrode 34 by means of a display driving means, not shown. In forming an image in the liquid crystal layer 22, it is necessary that the segment electrode and the common electrode coincide with each other. However, depending on the arrangement or the number of the display segments 22a to 22d, it could happen that an overlapping portion X of the electrodes is formed at a portion other than the display segments 22a to 22d, as shown in FIG. 13. If and when the display segment 22c is to be displayed in the case of the FIG. 13 embodiment, for example, the overlapping portion X of the electrodes can also be displayed, whereby an image could appear in an undesired portion. Therefore, in drafting an image being displayed on the liquid crystal layer 22, the portion for extension of the common electrode and the segment electrodes was restricted in order to avoid such undesired display of an image. However, by employing the color filter 31 shown in FIG. 11, such overlapping portion X of the electrodes can be concealed by an opaque portion 31e of the color filter 31 and therefore an advantage is brought about that the common electrode and the segment electrodes 33a to 33d can be extended as desired. However, if such advantage is not desired, alternatively the color filter may be implemented without forming such opaque portion 31e.

Figure 14:
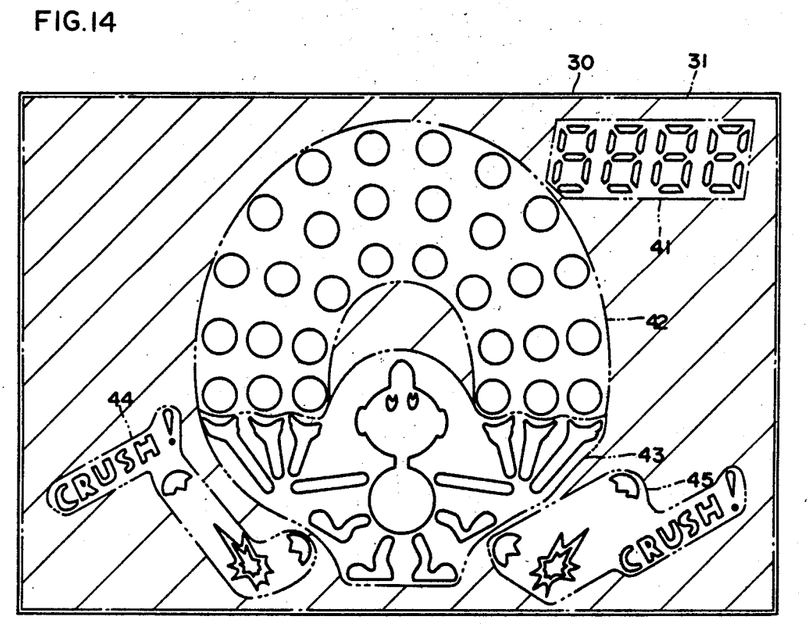
FIG. 14 is a view showing one example of a display embodied as a game apparatus.

FIG. 14 is a view showing one example of a display in the case where the present invention is applied in a game apparatus. The liquid crystal plate 30 is formed with a variety of display segments such as numeral characters for displaying the current time and a score point, a ball character for displaying a ball symbol, a person character for displaying a person symbol, and other decorating characters for displaying various characters and figures. A color filter 31 is disposed to be faced to the liquid crystal plate 30. The color filter 31 is formed with a filter portion 31 so as to cover the numeral characters. Likewise the color filter 31 is further formed with filter portions 42, 43, and 44 and 45 to cover the ball character, the person character, and the decorating characters, respectively. Accordingly, in the case of the FIG. 14 embodiment the numeral character, the ball character and the person character and the decorating characters can be displayed in different colors, respectively. Meanwhile, an opaque portion is formed, as described above, in the portion, as hatched, other than the filter portions 41 to 45 in the color filter 31.

By thus implementing a game apparatus employing a liquid crystal display to be capable of displaying game patterns in multiple colors, color changes are added to such game apparatus employing a liquid crystal display and as a result an interest of a game player is much more increased.

Figure 15:
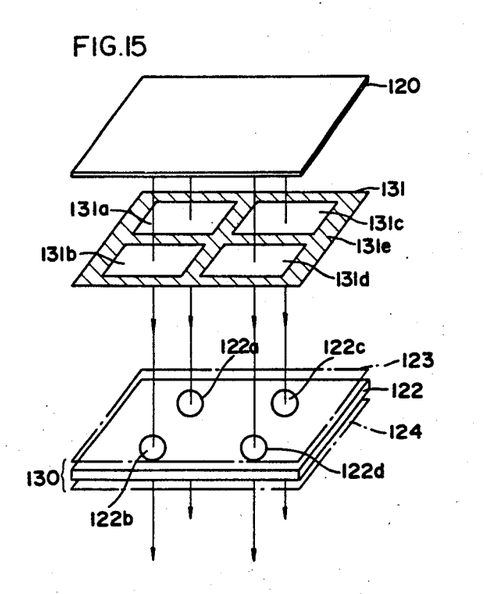
FIG. 15 is a view showing one example of a preferred arrangement of the liquid crystal plate and the color filter for use in the FIG. 5 embodiment.

FIG. 15 is a view showing a preferred example of the liquid crystal plate 130 and the color filter 131 for use in the FIG. 5 embodiment. As in the case of the FIG. 11 embodiment, the display segments 122a, 122b, 122c and 122d of the character configurations being displayed are formed in the liquid crystal layer 122. The liquid crystal layer 122 may be a liquid crystal layer of a twisted nematic type having the polarization filters 123 and 124 formed on both surfaces thereof. The polarization axes of these polarization filters 123 and 124 are selected to be in a predetermined relation, so that a light beam incident upon portions other than the display segments 122a to 122d being selectively driven for display may not transmit therethrough. More specifically, the liquid crystal layer 122 and the polarization filters 123 and 124 are structured such that a light beam is allowed to transmit only the display segment portions being selectively driven for display.

A color filter 131 is disposed facing the liquid crystal plate 130. The color filter 131 comprises a transparent film of such as polyester, as in the case of the FIG. 11 embodiment. The transparent film is formed with the filter portions 131a to 131d and the opaque portion 131e, as hatched, through a screening process. These filter portions 131a to 131d are formed at the positions facing the respective display segments 122a to 122d so as to cover the respective display segments. These filter portions 131a to 131d are structured as filters for allowing for transmission of light beams of colors in which it is desired to display the display segments 122a to 122d.

Since the FIG. 15 embodiment is structured such that the filter portions 131a to 131d are disposed to cover at least the display segments 122a to 122d having the character configurations being displayed, the display segments 122a to 122d can be displayed in desired colors, respectively, as in the case of the FIG. 11 embodiment.

Figure 16:
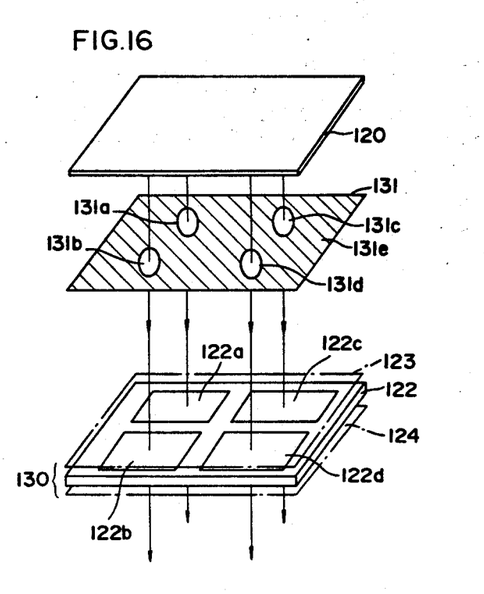
FIG. 16 is a view showing an example of another preferred arrangement of the liquid crystal plate and the color filter for use in the FIG. 5 embodiment.

FIG. 16 is a view showing another preferred example of the liquid crystal plate 130 and the color filter 131 for use in the FIG. 5 embodiment. Contrary to the FIG. 15 embodiment, the FIG. 16 embodment is adapted such that the filter portions 131a to 131d of the color filter 131 are formed in the shape of characters being displayed. The display segments 122a to 122d of the liquid crystal layer 122 are formed to be large enough to cover the filter portions 131a to 131d, respectively. The remaining portions may be substantially the same as those of the FIG. 15 embodiment. With such structure, when a given display segment of the liquid crystal plate 130 is driven for display to be made transparent, a light beam is allowed to transmit through only the color filter portion facing the above described display segment. Therefore, an image of the configuration of the color filter portion, i.e. the character configuration being displayed can be displayed in color. Accordingly, the FIG. 16 liquid crystal display plate also performs substantially the same effect as that of the FIG. 15 liquid crystal display plate.

Meanwhile, in the foregoing a liquid crystal display as embodied in a game apparatus was mainly described; however, it goes without saying that the present invention can be applied also to any other types of electronic apparatuses such as a timepiece, a calculator and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display for displaying at least two characters in different colors, comprising: a liquid crystal plate including a laminated structure of a transparent electrode layer having at least two segment electrodes associated with said at least two characters, and a liquid crystal layer substantially transparent in a portion corresponding to said segment electrodes for displaying said characters, said liquid crystal plate being adapted for receiving light on one surface of said liquid crystal plate and for emitting light from the other surface of said liquid crystal plate, and color filter means located to face one surface of said liquid crystal plate, said color filter means including at least two colored regions of different colors respectively opposite said at least two segment electrodes.

2. The display in accordance with claim 1, wherein one of said segment electrodes of said transparent electrode layer and the respective colored region of said color filter means located opposite said one segment electrode are formed in a character shape, and wherein the other of said segment electrodes and the respective one of said colored regions located opposite each other are selected to have a size covering said character shape.

3. The display in accordance with claim 1, wherein said color filter means comprises at least two color filter plates, whereby one color filter plate is provided for each of said colored regions.

4. The display in accordance with claim 1, wherein said color filter means comprises a single color filter plate which is opaque at a portion other than said at least two colored regions.

5. The display in accordance with claim 1, wherein said liquid crystal layer is formed as a twisted nematic type, and wherein said liquid crystal plate comprises a polarized filter provided in a laminated manner on said liquid crystal layer.

6. The display of claim 1, wherein one of said segment electrodes is formed in a character shape, and wherein the respective colored region of said color filter means opposite to said one segment electrode is shaped to at least cover the character shape.

7. The display of claim 1, wherein one of said colored regions of said color filter means is formed in a character shape, and wherein the respective segment electrode opposite to said one colored region is shaped to at least cover the character shape.

8. The display of claim 1, wherein said color filter means are located to face that surface of the liquid crystal plate which receives the light.

9. A display apparatus, comprising: a housing having wall means including at least a top wall and a side wall which adjoin each other, said top wall having a light transmitting portion for transmission of light therethrough, a liquid crystal plate held in said housing in a position for receiving light through said light transmitting portion for forming an image to be displayed, a mirror mounted in said housing in a predetermined positional relation relative to said liquid crystal plate, and window means formed in said side wall of said housing in a position corresponding to a reflecting path of said mirror, whereby said image is displayed through said window means upon transmission of light through said light transmitting portion, and wherein said liquid crystal plate comprises a laminated structure including a transparent electrode layer having at least two segment electrodes of a pattern associated with a character to be displayed and a liquid crystal layer being substantially transparent at a portion corresponding to said segment electrode when said character is to be displayed, and which further comprises color filter means (31) located to face one surface of said liquid crystal plate, said color filter means including at least two colored regions facing said segment electrodes, respectively, and one of said segment electrodes of said transparent electrode layer and that one of said colored regions of said color filter means which are facing each other being shaped so as to display said character being displayed, and the other of said segment electrodes and the other of said colored regions which are facing each other being shaped so as to display the respective character.

10. The display in accordance with claim 9, wherein said at least two colored regions of said color filter means have different colors.

11. The display in accordance with claim 10, wherein said color filter means comprises at least two color filter plates each plate providing one of said colored regions.

12. The display in accordance with claim 10, wherein said color filter means comprises a single color filter plate which is opaque at a portion other than said at least two colored regions.

13. The display in accordance with claim 9, wherein said liquid crystal layer is formed as a twisted nematic type, and wherein said liquid crystal plate comprises a polarized filter provided in a laminated manner on said liquid crystal layer.

14. The display of claim 9, wherein one of said segment electrodes is formed in a character shape, and wherein the respective colored region of said color filter means facing said one segment electrode is shaped to at least cover the character shape.

15. The display of claim 9, wherein one of said colored regions of said color filter means is formed in a character shape, and wherein the respective segment electrode facing said one colored region is shaped to at least cover the character shape.

16. The display of claim 9, wherein said color filter means are located to face that surface of the liquid crystal plate which receives the light.

* * * * *